(12) United States Patent
Sywyk et al.

(10) Patent No.: US 12,395,175 B2
(45) Date of Patent: Aug. 19, 2025

(54) LEVEL-SHIFTER HAVING A WIDE OPERATING RANGE, A FAST OUTPUT FALL DELAY AND IMPROVED RISE TIME

(71) Applicant: NVIDIA Corporation, Santa Clara, CA (US)

(72) Inventors: Stefan P. Sywyk, San Jose, CA (US); Lalit Gupta, Santa Clara, CA (US); Jesse Wang, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 230 days.

(21) Appl. No.: 18/326,539

(22) Filed: May 31, 2023

(65) Prior Publication Data

US 2024/0405776 A1    Dec. 5, 2024

(51) Int. Cl.

| | |
|---|---|
| *G11C 8/18* | (2006.01) |
| *G06F 30/36* | (2020.01) |
| *G11C 8/08* | (2006.01) |
| *G11C 8/10* | (2006.01) |
| *H03K 19/0185* | (2006.01) |
| *G06F 111/20* | (2020.01) |

(52) U.S. Cl.
CPC ..... *H03K 19/018521* (2013.01); *G06F 30/36* (2020.01); *G11C 8/08* (2013.01); *G11C 8/10* (2013.01); *G06F 2111/20* (2020.01)

(58) Field of Classification Search
CPC ........... H03K 19/018521; G06F 30/36; G06F 2111/20; G11C 8/08; G11C 8/10

USPC ..................................................... 365/230.06
See application file for complete search history.

(56) References Cited

U.S. PATENT DOCUMENTS

| | | | |
|---|---|---|---|
| 11,114,148 B1 * | 9/2021 | Pan ..................... | G11C 11/2257 |
| 2014/0320168 A1 * | 10/2014 | Luo ..................... | H03K 19/0013 |
| | | | 327/333 |
| 2016/0036443 A1 * | 2/2016 | Li ..................... | H03K 19/01721 |
| | | | 327/333 |
| 2018/0287609 A1 * | 10/2018 | Mallavajula ..... | H03K 3/356017 |
| 2021/0119619 A1 * | 4/2021 | Rastogi .................... | H03K 5/01 |
| 2021/0391862 A1 * | 12/2021 | Bogi ............. | H03K 19/017509 |
| 2022/0060186 A1 * | 2/2022 | Gupta .................... | H03K 3/037 |

* cited by examiner

*Primary Examiner* — Amir Zarabian (57) ABSTRACT

The disclosure introduces a level-shifter including a boost circuit that provides a "one-shot" pulse (a self-annihilating pulse) with the transitioning edge of the output signal. The pulse can be used to produce a faster output rise time and reduce the overall footprint of a level-shifter compared to conventional level-shifters. In one example the level-shifter includes: (1) input circuitry configured to receive one or more input signals from one or more input voltage domains, (2) output circuitry configured to provide an output signal, based on at least one of the one or more input signals, for an output voltage domain, wherein an operating voltage of the output voltage domain is greater than an operating voltage of the one or more input voltage domains, and (3) a boost circuit connected to the output circuitry and configured to provide a current pulse for a transition edge of the output signal.

23 Claims, 6 Drawing Sheets

LEVEL-SHIFTER HAVING A WIDE OPERATING RANGE, A FAST OUTPUT FALL DELAY AND IMPROVED RISE TIME

TECHNICAL FIELD

This application is directed, in general, to communicating data on integrated circuits (ICs) and, more specifically, to an improved level-shifter for transmitting data across IC domains having different voltages.

BACKGROUND

ICs typically include different partitions that operate on different voltage domains. The different voltage domains can be independent of each other. For example, the voltages of the different voltage domains can vary between Vmin and Vmax. Accordingly, each of the voltages can be dynamic. Often large amounts of data needs to be transferred from one voltage domain to another voltage domain. When the domains operate on different voltages, additional circuitry is required, such as level-shifters, for the data transfers.

SUMMARY

In one aspect, the disclosure provides a level-shifter. In one example the level-shifter includes: (1) input circuitry configured to receive one or more input signals from one or more input voltage domains, (2) output circuitry configured to provide an output signal, based on at least one of the one or more input signals, for an output voltage domain, wherein an operating voltage of the output voltage domain is greater than an operating voltage of the one or more input voltage domains, and (3) a boost circuit connected to the output circuitry and configured to provide a current pulse for a transition edge of the output signal.

In another aspect, the disclosure provides an IC. In one example, the IC includes: (1) an input voltage domain that operates at a first voltage, and (2) an output voltage domain that operates at a second voltage different than the first voltage, and (3) a level-shifter that translates an input signal from the input voltage domain to the output voltage domain, wherein the level-shifter includes a boost circuit that generates a current pulse at a transition edge when translating the input signal to the output voltage domain.

In yet another aspect, the disclosure provides a memory circuit. In one example the memory circuit includes: (1) a memory array having rows of word lines, and (2) a row decoder having a level-shifter with a boost circuit, wherein the row decoder is configured to receive input signals and generate a decoded address that indicates which one of the word lines to enable.

In still an additional aspect, the disclosure provides a library of circuit designs. In one example the library has a design for a level-shifter that includes: (1) input circuitry configured to receive one or more input signals from one or more input voltage domains, (2) output circuitry configured to provide an output signal, based on at least one of the one or more input signals, for an output voltage domain, wherein an operating voltage of the output voltage domain is greater than an operating voltage of the one or more input voltage domains, and (3) a boost circuit connected to the output circuitry and configured to provide a current pulse for a transition edge of the output signal.

BRIEF DESCRIPTION

Reference is now made to the following descriptions taken in conjunction with the accompanying drawings, in which.

DETAILED DESCRIPTION

Level-shifters are circuits that are used to translate signals from one logic level or voltage domain to another one. Level-shifters are extremely useful in ICs since they allow compatibility between circuitry having different voltage requirements. Level-shifters typically include a combination of low voltage transistors and high voltage transistors that cooperate to transmit data, such as high and low logic signals, from one voltage domain to another. For example, a low voltage transistor receives an input signal from a low voltage domain, i.e., a low input voltage domain $V_{DDL}$, and multiple high voltage transistors cooperate with the low voltage transistor to convert the input signal to a high output voltage domain, i.e., $V_{DDH}$.

During the conversion, there is often a challenge to overcome the existing state of the high voltage transistors since they are more powerful than the low voltage transistors. To compensate for the difference, the low voltage transistor that receives the input signal is typically substantially larger than the high voltage transistors used to output the converted signal. For example, the input transistor can be an NMOS transistor that is ten times the physical size of output PMOS transistors to be able to drive the output PMOS transistors. The physical size can be the footprint of the input transistor due to, for example, the width, number of fins, channel length, etc. The same is true when the input transistor is a PMOS and the output transistor is an NMOS. Additionally, a single transition, such as for the rising edge instead of the falling edge of the input signal, is typically optimized in a level-shifter for the signal translations. Optimizing for one transition can also result in increasing the size ratio between the low voltage input transistor and the high voltage output transistor. Accordingly, compensating for driving the high voltage output transistors and optimizing for a single type of transition (rising or falling edge) can result in using an even larger input transistor compared to the output transistors. The need to increase the size ratio can be even a greater problem when the difference between the low voltage value and the high voltage value increases. For example, the size ratio typically needs to be greater when the input voltage domain is 0.5 volts and the output voltage domain is 1.35 volts.

The disclosure provides features for improving the transmission of data between different voltage domains of an IC, such as a chip. The disclosure introduces a level-shifter including a boost circuit that provides a "one-shot" pulse (a self-annihilating pulse) with the transitioning edge of the output signal. The transitioning edge is considered the critical edge and can be the rising edge. Considering the rising edge, the level-shifter includes FET transistors wherein the boost circuit includes larger PFETs in parallel with smaller PFETs of the output when the exposed output is rising. The larger PFETs advantageously are transiently activated to provide the pulse. The pulse produces a faster output rise time and, since the larger PFETs of the boost circuit are then deactivated, they do not affect the large N-to-P ratio typically required for a level-shifter to be able to operate with a large voltage supply spread. Accordingly, the overall footprint of the level-shifter is reduced compared to conventional level-shifters.

Figure 1:
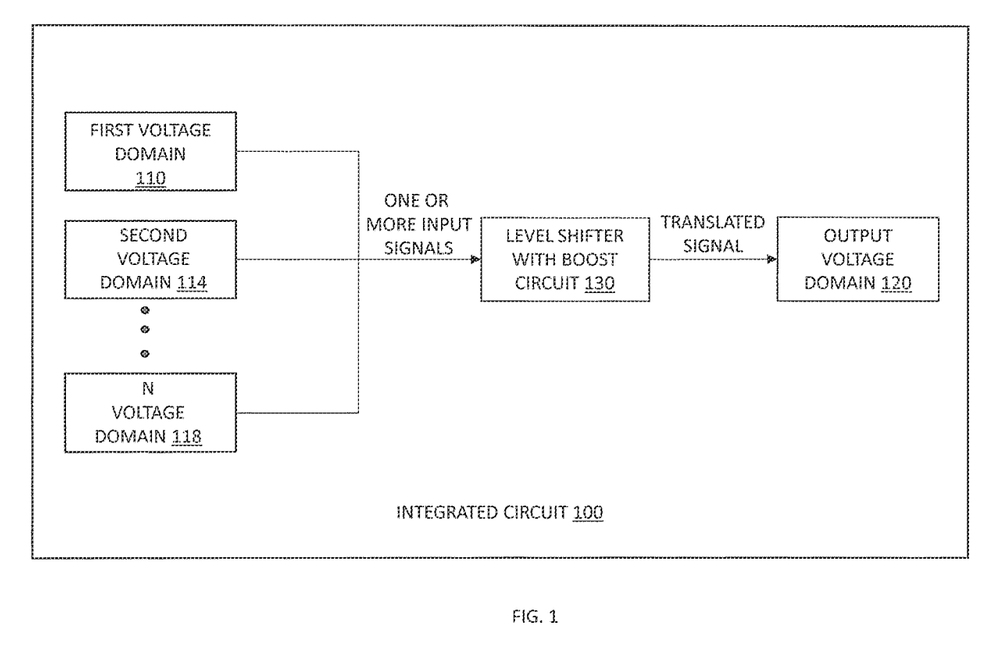
FIG. 1 illustrates a block diagram of an example integrated circuit (IC) constructed according to the principles of the disclosure.

FIG. 1 illustrates a block diagram of example IC 100 constructed according to the principles of the disclosure. The IC 100 includes multiple input voltage domains represented by domains 110, 114, 118, which operate at one or more different operating voltages. The IC 100 can include additional voltage domains, such as output voltage domain 120, which has a higher operating voltage than the multiple voltage domains 110, 114, 118. Each of the input voltage domains 110, 114, 118, and the output voltage domain 120 are configured to provide one or more functions and can cooperate to perform a designated function for the IC 100. The input voltage domains 110, 114, 118, for example, can send data, such as input signals, to the output voltage domain 120 for processing. The output voltage domain 120 can provide a data output for the IC 100, which can be provided to another IC. Since the output voltage domain 120 operates at a higher voltage than each of the input voltage domains 110, 114, 118, the IC 100 also includes a level-shifter 130 that translates the one or more input signals from the input voltage domains 110, 114, 118, for the output voltage domain 120. The output voltage domain can operate at 1.35 volts and the input voltage domains 110, 114, 118, can operate at less than 1.0 volt, such as at 0.5 volts. Advantageously, the level-shifter 130 includes a boost circuit as disclosed herein. The level-shifter 130 can be, for example, the level-shifter of FIG. 2 or 4. The IC 100 can include additional domains and other components that are typical components of an IC.

Figure 2:
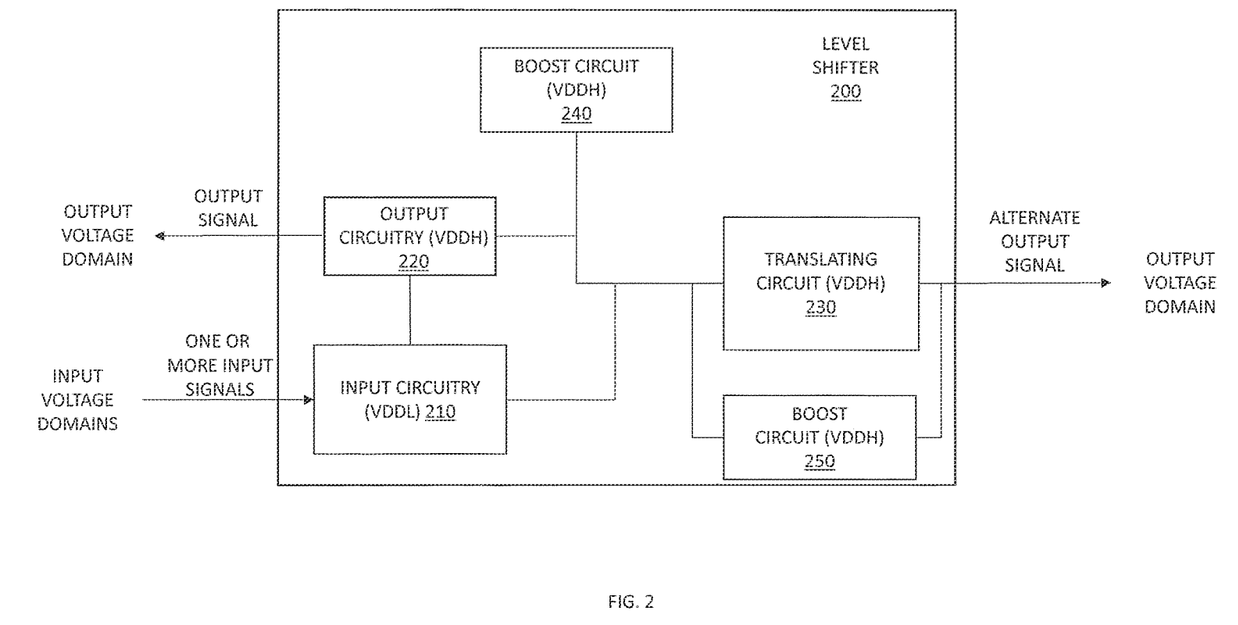
FIG. 2 illustrates a block diagram of an example of a level-shifter constructed according to the principles of the disclosure.

FIG. 2 illustrates a block diagram of an example of a level-shifter 200 constructed according to the principles of the disclosure. The level-shifter 200 receives one or more input signals from one or more input voltage domains and translates the received input signals into an output signal for at least one output voltage domain. The level-shifter 200 can be used with one or more different input voltage domains and two or more of the input voltage domains can operate at a different operating voltage. Regardless the number of input voltage domains, the level-shifter 200 translates a single input signal to an output signal at one time. The level-shifter 200 can be configured for a single input voltage domain, such as the level-shifter 300 of FIG. 3, or configured for multiple input voltage domains, such as the level-shifter 400 of FIG. 4. The level-shifter 200 includes input circuitry 210, output circuitry 220, and a translating circuit 230.

The input circuitry 210 includes circuitry to receive the one or more input signals and the output circuitry 220 includes circuitry to provide the output signal. The input circuitry 210 operates at a low $V_{DD}$, $V_{DDL}$, compared to the $V_{DD}$ of the output circuitry 220, $V_{DDH}$. The circuitry for both the input circuitry 210 and the output circuitry 220 can be one or more transistors, such as MOSFET transistors, arranged in a stack. At least one of the transistors of the input circuitry 210 and the output can be controlled by the one or more input signals from the input voltage domains. The polarity of the transistors used in the input circuitry 210 is opposite the polarity of the transistors used in the output circuitry 220. For example, when the input circuitry 210 includes PFETs the output circuitry 220 includes NFETs and vice versa.

The translating circuit 230 is configured to provide feedback to the output circuitry 220. The translating circuit 230 can also be a transistor stack of one or more transistors connected in series. The translating circuit 230 can include transistors of different polarity, such as NFETs and PFETs. As with the output circuitry 220, the translating circuit 230 operates at $V_{DDH}$. As shown in FIG. 2, an alternate output signal can be provided from the translating circuit 230. The polarity of the alternate output signal is opposite the polarity of the output signal from the output circuitry 220. The alternate output signal and the output signal from the output circuitry 220 can be provided to the same output voltage domain or to different output voltage domains. One or more of the input circuitry 210, the output circuitry 220, and the translating circuit 230 can be circuits typically used with level-shifters in the industry.

In addition to the above noted components, the level-shifter 200 also includes a boost circuit 240. The boost circuit 240 is connected to the output 230 and is configured to provide a current pulse for a transition edge of the output signal. Advantageously, the boost circuit 240 is not located in the critical path between the input signal and the output signal. The boost circuit 240 improves the transitioning edge delay of the output signal with no affect, or at least a minimum affect, on the size ratio between an input transistor of the input circuitry 210 and an output transistor of the output circuitry 220. As with the output circuitry 220 and the translating circuit 230, the boost circuit 240 operates at $V_{DDH}$. The boost circuit 240 can include a boost transistor stack having transistors that are controlled by the feedback from the translating circuit 230. The boost circuit 240 can also include a delay circuit connected to a gate of a transistor of the boost transistor stack. The delay circuit includes an odd number of inverters coupled in series that cooperates with the boost transistor stack to provide the transitioning edge delay. The boost transistor stack can be coupled in parallel to an output transistor stack of the output. The level-shifter 200 also includes a second boost circuit, boost circuit 250 that is configured to provide a current pulse for the transition edge of the alternate output signal. The boost circuit 250 can be similarly configured as the boost circuit 240 and operate at $V_{DDH}$. The level-shifter 200 may include both boost circuits 240 and 250 or may only include one. Boost circuit 340 of FIG. 3 provides an example of boost circuits 240 and 250.

Figure 3:
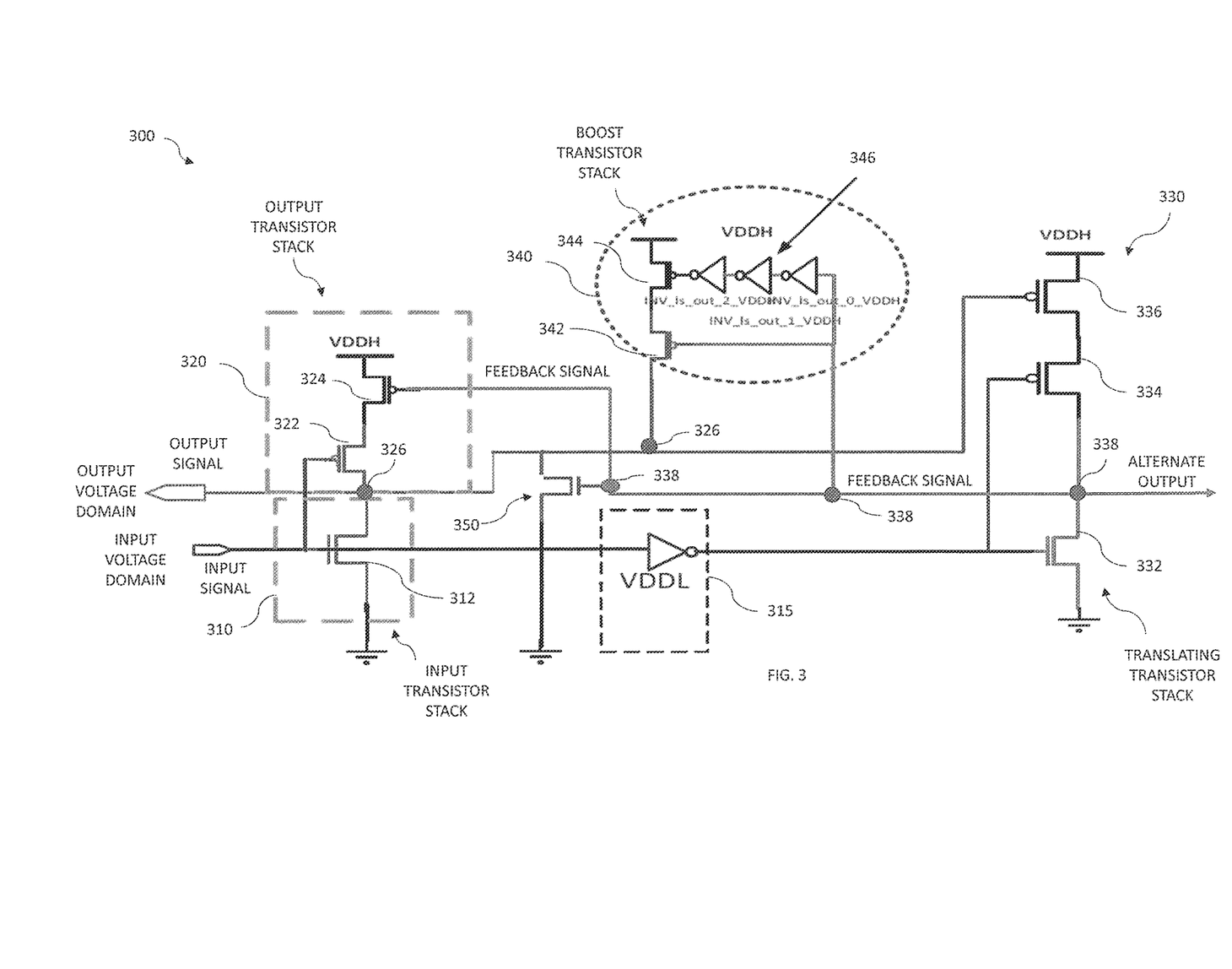
FIG. 3 illustrates a schematic diagram of an example of a single input level-shifter constructed according to the principles of the disclosure.

FIG. 3 illustrates a schematic of an example of a single input level-shifter 300 constructed according to the principles of the disclosure. Level-shifter 300 provides an example of level-shifters 130 and 200. Level-shifter 300 receives an input signal from an input voltage domain and translates the input signal to an output signal for an output voltage domain that has a higher operating voltage than the input voltage domain. Level-shifter 300 includes input circuitry 310, an inverter 315, output circuitry 320, a translating circuit 330, a boost circuit 340, and transistor 350. One or more of the input circuitry 310, the inverter 315, the output circuitry 320, the translating circuit 330, and the transistor 350 can be circuits typically used with level-shifters in the industry.

The input circuitry 310 includes circuitry to receive an input signal from an input voltage domain that operates at a low $V_{DD}$, $V_{DDL}$. The input circuitry 310 includes an input transistor stack. In the illustrated example, the input transistor stack includes a single NFET, transistor 312, which is controlled by the input signal. The inverter 315 also receives the input signal from the input voltage domain, inverts the polarity thereof, and provides the inverted input signal to the translating circuit 330.

The translating circuit 330 includes a transistor stack that operates at a high $V_{DD}$, $V_{DDH}$, compared to the input voltage domain. The transistor stack includes three transistors 332, 334, 336, which are connected in series between $V_{DDH}$ and ground. Transistor 332 receives the inverted input signal from the inverter 315. Transistor 332 is the same polarity as transistor 312 and, therefore, is an NFET. Transistors 334, 336, have an opposite polarity of transistor 332 and are PFETs. Like transistor 332, transistor 334 also receives the inverted input signal from the inverter 315 and is controlled thereby. A feedback signal is provided from the translating circuit 330 at node 338 located between transistors 332 and 334. An alternate output signal can also be provided at node 338.

The output circuitry 320 and the boost circuit 340 receive the feedback signal. The output circuitry 320 includes an output transistor stack that is connected in series with the input transistor stack between $V_{DDH}$ and ground. The output transistor stack includes transistors 322 and 324 that are of opposite polarity of input transistor 312 and, therefore, are PFETs in this example. Transistor 322 is controlled by the input signal and transistor 324 is controlled by the feedback signal. The output signal is provided from node 326 that is located between transistors 312 and 322. Node 326 is also connected to transistor 336 of the translating circuit 330 and the boost circuit 340. Boost circuit 340 is not part of the critical path between the input circuitry 310 and the output circuitry 320 wherein the input signal is translated to the output signal.

The boost circuit 340 is configured to provide a current pulse for a transition edge of the output signal that improves a transitioning edge delay of the output signal without degrading the output to input transistor ration, which is a P/N ratio for level-shifter 300. For example, the rising edge of output transition of conventional level-shifters can be sloppy due to a P/N ration of 1/10. For level-shifter 300 the P/N ratio can be 1/10 when having four fins for each PMOS transistor 324, 326, which will give an effective fin size of two due to the stack configuration, and NMOS transistor 312 having a fin size of twenty. With the boost circuit 340, both the rising and falling edge can be improved without degrading the P/N ratio. In the illustrated example of FIG. 3, the transition edge can be the rising edge of the output signal. As with the output circuitry 320 and the translating circuit 330, the boost circuit 340 is coupled between $V_{DDH}$ and ground. The boost circuit 340 is coupled to ground via transistor 350 that is controlled by the feedback signal.

The boost circuit 340 includes a boost transistor stack 342 having transistors 343, 344, that are controlled by the feedback signal from node 338 of the translating circuit 330. The boost circuit 340 also includes a delay circuit 346 connected to the gate of transistor 344 of the boost transistor stack 342. The delay circuit 346 includes an odd number of inverters coupled in series that cooperates with the boost transistor stack 342 to provide the transitioning edge delay for the rising edge of the output signal. In FIG. 3, the delay circuit 346 include three inverters but another number of odd converters can be used, such as one or five, to obtain the amount of delay desired for a particular design to provide the short duration boost for the rising edge. The boost occurs while both transistors 342, 344, are activated. The delay circuit 346, with the odd number of inverters, controls the amount of time when both transistors 342 and 344 are activated since both transistors 342, 344, are controlled by the feedback signal. The boost transistor stack 342 is coupled in parallel to the output transistor stack of the output circuitry 320 between $V_{DDH}$ and node 326.

Figure 4:
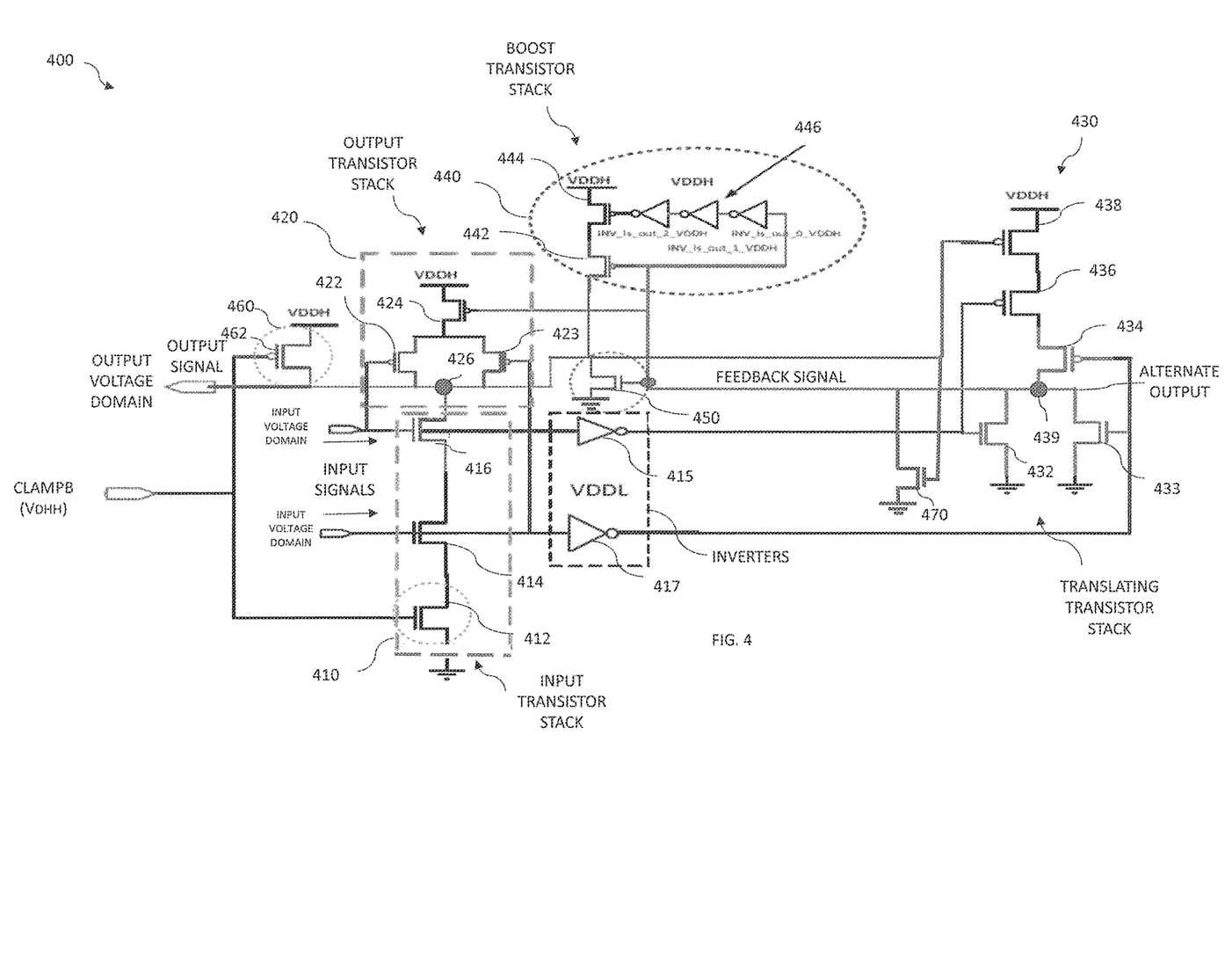
FIG. 4 illustrates a schematic diagram of an example of a multi-input level-shifter constructed according to the principles of the disclosure.

Level-shifter 300 is shown without using a clamp. FIG. 4 provides an example of a level-shifter that employs a clamping signal in addition to demonstrating a level-shifter with a NAND function. Similar to level-shifter 400 of FIG. 4, level-shifter 300 can also include a clamp. Additionally, similar to level-shifter 300, level-shifter 400 may also operate without a clamp.

FIG. 4 illustrates a schematic diagram of an example of a multi-input level-shifter 400 constructed according to the principles of the disclosure. The level-shifter 400 operates similar to level-shifter 300 but instead of a single input signal, level-shifter 400 is configured to receive two input signals from one or more input voltage domains and translate each of the input signals to an output signal for an output voltage domain that has a higher operating voltage than an input voltage domain. The input signals can be received from the same input voltage domain. Advantageously, a single boost circuit, boost circuit 440, can be used for translating both input signals. In addition to the boost circuit 440, the level-shifter 400 includes input circuitry 410, inverters 415 and 417, output circuitry 420, translating circuit 430, transistor 450, and control circuitry 460. Similar to the boost circuit 250 of level-shifter 200, level-shifter 400 can also include an additional boost circuit for an alternate output signal.

The input circuitry 410 receives a first input signal and a second input signal from the input voltage domain that operates at a low $V_{DD}$, $V_{DDL}$, compared to the $V_{DDH}$ of the output voltage domain. The input circuitry 410 includes an input transistor stack having three transistors connected in series, transistors 412, 414, and 416. In the illustrated example, the transistors 412, 414, and 416 are NFETs. Transistor 416 is controlled by the first input signal and transistor 414 is controlled by the second input signal. Transistor 412 is controlled by a clamp signal connected to the control circuitry 460. The inverters 415 and 417 also receive the first and second input signals, respectively, from the input voltage domain. The inverters 415, 417, inverts each respective input signal and provide the inverted input signal to the translating circuit 430.

The translating circuit 430 includes a transistor stack that operates at $V_{DDH}$. The transistor stack includes multiple transistors that are connected between $V_{DDH}$ and ground. Transistors 432 and 433 receive the inverted input signals from the respective inverters 415 and 417. Transistors 432, 433, are the same polarity as the transistors 414 and 416 and, therefore, are NFETs in this example. The transistor stack of the translating circuit 430 also includes transistors 434, 436, and 438. Transistors 434, 436, and 438 have an opposite polarity of transistors 432, 433, and are PFETs in this example. Like transistor 432, transistor 436 also receives the inverted first input signal from the inverter 415 and is controlled thereby. Like transistor 433, transistor 434 also receives the inverted second input signal from the inverter 417 and is controlled thereby. Transistors 432, 433, are coupled in parallel between node 439 and ground. The parallel-coupled transistors 432, 433, are coupled in series with the other transistors of the translating circuit 430, transistors 434, 436, 438, between $V_{DDH}$ and ground. A feedback signal is provided from the translating circuit 430 at node 439 located between the parallel-coupled transistors 432, 433, and transistor 434. An alternate output signal can also be provided at node 439. Both the output circuitry 420 and the boost circuit 440 receive the feedback signal.

The output circuitry 420 includes an output transistor stack that is connected in series with the input transistor stack between $V_{DDH}$ and ground. The output transistor stack includes transistors 422, 423, and 424 that are of opposite polarity of input transistors 414, 416, and, therefore, are PFETs in this example. Transistor 422 is controlled by the first input signal and transistor 423 is controlled by the second input signal. Transistors 422 and 423 are connected in parallel between node 426 and transistor 424, which is controlled by the feedback signal. The output signal is provided from node 426. Node 426 is also connected to transistor 438 of the translating circuit 430 and to the boost circuit 440. As with boost circuit 340, boost circuit 440 is not part of the critical paths between the input circuitry 410 and the output circuitry 420 for translating the first and second input signals.

The boost circuit 440 is configured to provide a current pulse for the rising edge of the output signal. The boost circuit 440 is coupled between $V_{DDH}$ and ground via transistor 450 and includes a boost transistor stack 442 having transistors 443, 444, that are controlled by the feedback signal from node 439 of the translating circuit 430. The boost circuit 440 also includes a delay circuit 446 connected to the gate of transistor 444 that operates as the delay circuit 346 of boost circuit 340. The boost transistor stack 442 is coupled in parallel to the output transistor stack of the output circuitry 420 between $V_{DDH}$ and node 426. Transistor 450, which similarly operates as transistor 350 of level-shifter 300, is connected between node 426 and ground and is also controlled by the feedback signal.

Control circuit 460 is connected between node 426 and $V_{DDH}$ and is configured to work with transistor 412 to switch between the output signal representing the first input signal or the second input signal. Both transistor 412 and 462 are controlled by a clamping signal, CLAMPB in FIG. 4. For example, when CLAMPB is logic high, an input signal is level-shifted from the $V_{DDL}$ input voltage domain to the $V_{DDH}$ output voltage domain. When CLAMPB is logic low, the output signal of level-shifter 400 is clamped to the $V_{DDH}$ output voltage domain independent of what is driving on the first input signal and the second input signal. The control circuit 460 includes transistor 462 that has an opposite polarity from transistor 412 and is, therefore, a PFET. CLAMPB signal works when $V_{DDL}$ collapses and $V_{DDH}$ is driven, at that time first and second input signals will be floating and avoiding DC current through level-shifting and following stages the output of the level shifter 400 is clamped to high. For level-shifter 400, CLAMPB is always driven from the $V_{DDH}$ output voltage domain.

Figure 5:
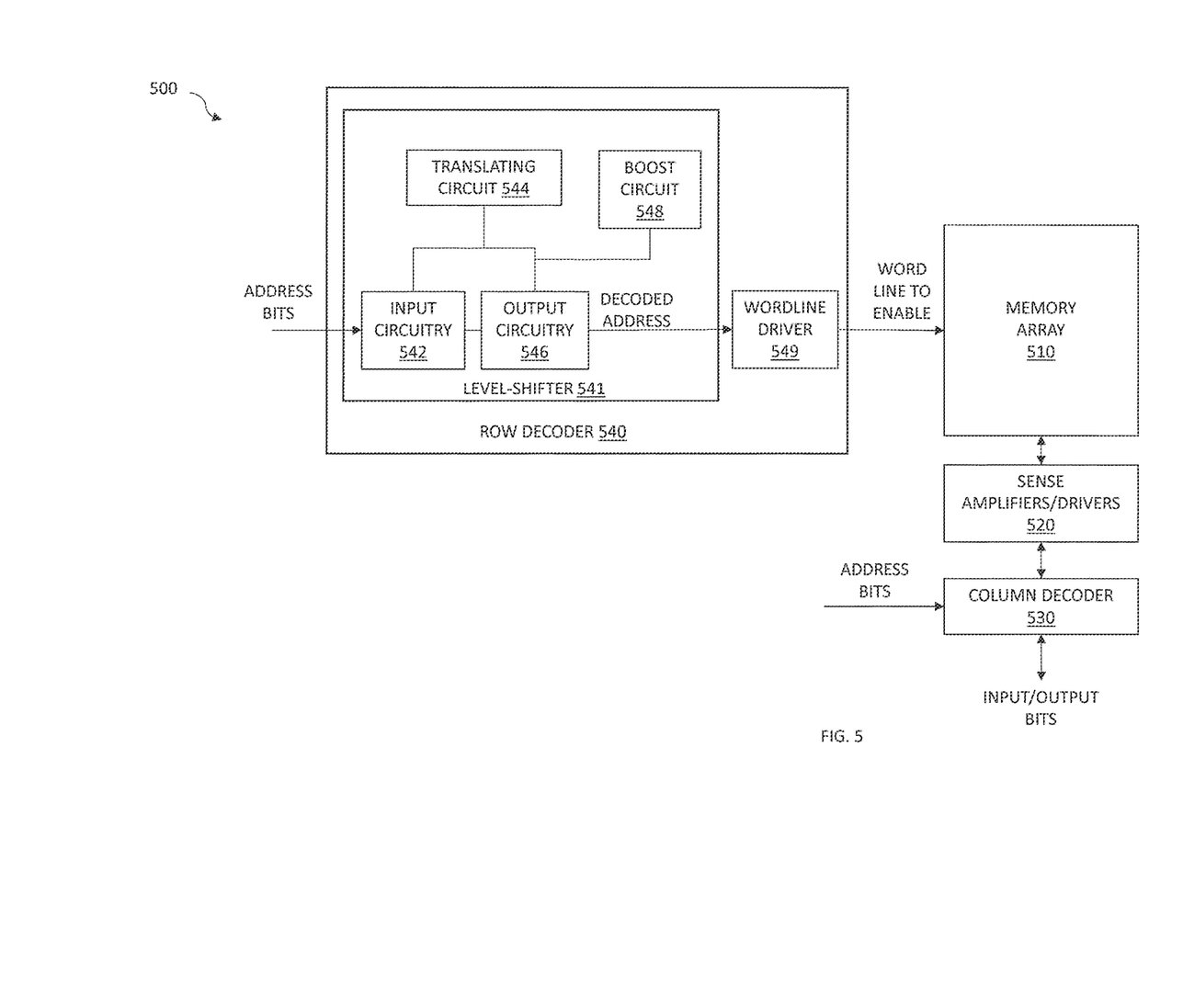
FIG. 5 illustrates a block diagram of an example of a memory circuit having a level-shifter constructed according to the principles of the disclosure.

FIG. 5 illustrates a block diagram of an example of a memory circuit 500 having a level-shifter constructed according to the principles of the disclosure. The memory circuit 500 can be integrated with an IC or can be connected to another IC. For example, the memory circuit 500 can be part of IC 100 or connected to IC 100 of FIG. 1. The memory circuit 500 can be a RAM. The memory circuit 500 includes a memory array 510, sense amplifiers/drivers 520, a column decoder 530, and a row decoder 540. The memory circuit 500 can include additional components typically included with a memory circuit, such as a RAM.

The memory array 510 includes memory cells organized into rows (word lines) and columns (bit lines). The column decoder 530 is used to select one or more-bit lines of the memory array 510 for reading or writing data based on the address bits. The sense amplifier/driver 520 senses low power signals from the selected bit lines that corresponds to a data bit stored in a memory cell of the memory array 510 and amplifies the sensed power signals to logic levels that can be recognized and further processed. The sense amplifier/driver 520 also provides decoded address bits from the column decoder 530 for selecting the bit lines for reading or writing.

The row decoder 540 is used to select a word line of the memory array 510 for reading or writing data based on the address bits. The translated address bits enable a word line of the memory array 510 for reading or writing data. The row decoder 540 includes a level-shifter 541 that receives the address bits from an input voltage domain and translates the address bits to be used by an output voltage domain, which is the memory array 510. The level-shifter 541 functions as a NAND decoder and can be, for example, level-shifter 200 or 400 as shown in FIGS. 2 and 4. Accordingly, the level-shifter 541 includes input circuitry 542, translating circuit 544, output circuitry 546, and boost circuit 548 that are configured to function similarly to the same components discussed above with respect to FIGS. 2 and 4. The output circuitry 546 provides a decoded address from the address bits received by the input circuitry 542. Level-shifter 541 also includes a wordline driver that receives the decoded address from the output circuitry 546 and provides a wordline to enable in the memory array 510. The wordline driver 549 can invert the received decoded address for enabling the wordline.

Figure 6:
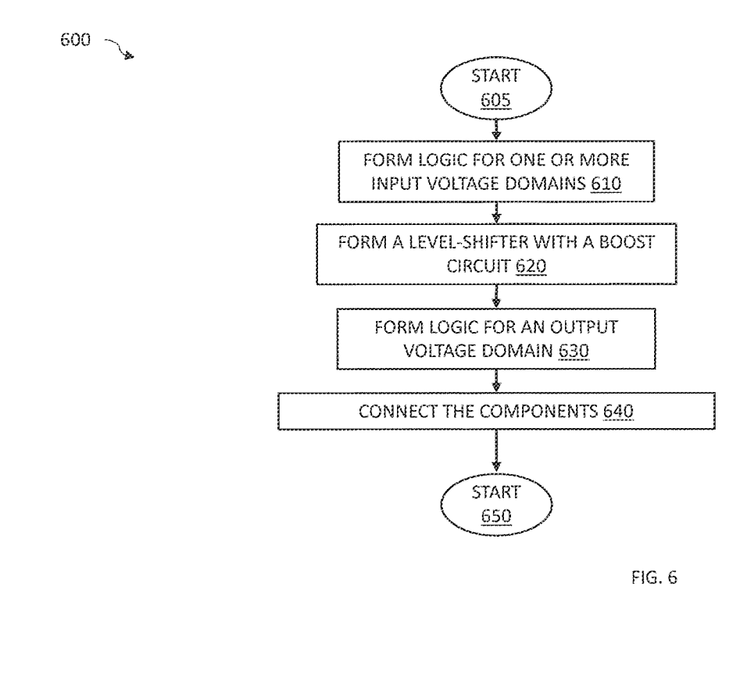
FIG. 6 illustrates a flow diagram of an example method of manufacturing an IC carried out according to the principles of the disclosure.

FIG. 6 illustrates a flow diagram of an example method 600 of manufacturing an IC carried out according to the principles of the disclosure. The IC can be the IC of FIG. 1 and include a level-shifter with one or more boost circuits such as disclosed in FIGS. 1, 2, 3, and 4 or the memory circuit 500 of FIG. 5. The IC can be formed in silicon using manufacturing techniques of the industry. In addition to the components and connections that are discussed herein, the IC that is formed can include additional components and connections that are typically included within an IC. The steps of the method 600 do not have to be performed in the same order as presented below. The method 600 begins in step 605.

In step 610, logic is formed for one or more input voltage domains. Multiple logic blocks can be formed and a library of circuit designs can be used to layout and form various components of the input voltage domains, the functional logic blocks themselves, or a combination of both. When more than one input voltage domain is formed, the different functional logic blocks can be formed to operate at different operating voltages.

In step 620 a level-shifter with a boost circuit is formed. The level-shifter can be one or the level-shifters disclosed in FIG. 1, 2, 3, or 4. The library of circuit designs can include level-shifters that are selected to be formed in step 620. More than one level-shifter may be formed.

A logic block of an output voltage domain is formed in step 630. The output voltage domain logic block is formed to operate at a higher voltage than the one or more input voltage domain logic blocks. The output voltage domain is configured to receive a translated signal from the level-shifter.

In step 640, the various components are connected. The one or more input voltage domain logic blocks are connected to the level-shifter with a boost circuit and the level-shifter is connected to the output voltage domain. The connections can be typical connections used in semiconductor manufacturing of ICs. The method 600 continues to step 650 and ends. The method 600 can be repeated multiple times.

A portion of the above-described apparatus, systems or methods may be embodied in or used for various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media or non-transitory computer-readable medium, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

The digital data processors or computers can be comprised of one or more processing units. The processing unit may include one or more GPUs, one or more CPUs, one or more hardware accelerators, e.g., a deep learning accelerator, a vision processing unit, and a tensor processing unit, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center. The processing units can include one or more of the circuits or circuitry disclosed herein.

The processing units in the processors or computers, such as GPUs, can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip. Configured or configured to means, for example, designed, constructed, or programmed, with the necessary logic and/or features for performing a task or tasks.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of examples are described herein. It is noted that as used herein and in the appended claims, the singular forms "a", "an", and "the" include plural referents unless the context clearly dictates otherwise.

Each of the aspects disclosed in the Summary may have one or more of the additional features of the dependent claims in combination.

What is claimed is:

1. A level-shifter, comprising:
   input circuitry configured to receive one or more input signals from one or more input voltage domains;
   output circuitry configured to provide an output signal, based on at least one of the one or more input signals, for an output voltage domain, wherein an operating voltage of the output voltage domain is greater than an operating voltage of the one or more input voltage domains; and
   a boost circuit connected to the output circuitry and configured to provide a current pulse for a transition edge of the output signal, wherein the input circuitry includes an input transistor stack connected in series with an output transistor stack of the output circuitry.

2. The level-shifter as recited in claim 1, wherein the boost circuit includes a boost transistor stack connected to the output circuitry and a delay circuit connected to a gate of a transistor of the boost transistor stack.

3. The level-shifter as recited in claim 2, wherein a duration of the current pulse corresponds to a duration wherein each of the transistors of the boost transistor stack are simultaneously activated.

4. The level-shifter as recited in claim 2, wherein the delay circuit includes an odd number of inverters.

5. The level-shifter as recited in claim 2, wherein each of the transistors of the boost stack are controlled by a same signal with opposite polarity.

6. The level-shifter as recited in claim 2, wherein the output transistor stack is connected in parallel to the boost transistor stack.

7. The level-shifter as recited in claim 1, wherein at least one transistor of the input transistor stack and the output transistor stack are controlled by the one or more input signals.

8. The level-shifter as recited in claim 7, wherein transistors of the boost stack and the input transistor stack are of a same polarity that is different than a polarity of the transistors of the output stack.

9. The level-shifter as recited in claim 7, further comprising a control circuit connected to the output and the input circuitry.

10. The level-shifter as recited in claim 1, wherein the output signal is a first output signal and the boost circuit is a first boost circuit, the level-shifter further comprising a second output signal and second boost circuit connected thereto.

11. The level-shifter as recited in claim 1, wherein the transition edge is a rising edge.

12. A chip including at least one level-shifter as recited in claim 1.

13. An integrated circuit (IC), comprising:
    an input voltage domain that operates at a first voltage;
    an output voltage domain that operates at a second voltage different than the first voltage; and
    a level-shifter that translates an input signal from the input voltage domain to the output voltage domain, wherein the level-shifter includes input circuitry having an input transistor stack, output circuitry having an output transistor stack connected in series with the input transistor stack, and a boost circuit that generates a current pulse at a transition edge when translating the input signal to the output voltage domain.

14. The IC as recited in claim 13, wherein the transition edge is a rising edge.

15. The IC as recited in claim 13, wherein the boost circuit includes a boost transistor stack and a delay circuit connected to a gate of a transistor of the boost transistor stack.

16. The IC as recited claim 15, wherein the delay circuit includes an odd number of inverters.

17. The IC as recited claim 15, wherein each of the transistors of the boost stack are controlled by a same feedback signal from a translating circuit of the level-shifter.

18. The IC as recited claim 15, wherein a duration of the current pulse corresponds to a duration wherein each of the transistors of the boost transistor stack are simultaneously activated.

19. The IC as recited claim 13, wherein at least one transistor of the input transistor stack and the output transistor stack are controlled by the input signal.

20. A method of manufacturing an IC as recited in claim 13.

21. A memory circuit, comprising:
a memory array having rows of word lines; and
a row decoder having a level-shifter with a boost circuit, wherein the row decoder is configured to receive input signals and generate a decoded address that indicates which one of the word lines to enable, wherein the level shifter further includes input circuitry having an input transistor stack and output circuitry having an output transistor stack connected in series with the input transistor stack.

22. The memory circuit as recited in claim 21, wherein the memory circuit is a RAM.

23. A library of circuit designs, comprising:
a design for a level-shifter that includes:
    input circuitry configured to receive one or more input signals from one or more input voltage domains;
    output circuitry configured to provide an output signal, based on at least one of the one or more input signals, for an output voltage domain, wherein an operating voltage of the output voltage domain is greater than an operating voltage of the one or more input voltage domains; and
    a boost circuit connected to the output circuitry and configured to provide a current pulse for a transition edge of the output signal, wherein the input circuitry includes an input transistor stack connected in series with an output transistor stack of the output circuitry.

* * * * *